United States Patent [19]

Grieder et al.

[11] Patent Number: 4,592,835
[45] Date of Patent: Jun. 3, 1986

[54] PRESSURE FILTER

[75] Inventors: Max Grieder, Tecknau, Switzerland; Albert D. Evans, Lowton nr. Warrington, Great Britain; Hans Weibel, Liestal, Switzerland

[73] Assignee: Rosenmund AG, Liestal, Switzerland

[21] Appl. No.: 659,481

[22] Filed: Oct. 10, 1984

[30] Foreign Application Priority Data

Oct. 18, 1983 [CH] Switzerland ............... 5663/83

[51] Int. Cl.⁴ ............................................. B01D 23/20
[52] U.S. Cl. .................................... 210/107; 210/298; 210/408; 210/413; 210/531
[58] Field of Search ............... 210/107, 298, 332, 334, 210/407, 408, 413-415, 523, 528, 531

[56] References Cited

U.S. PATENT DOCUMENTS

| 624,633 | 5/1899 | Edwardes | 210/408 X |
|---|---|---|---|
| 903,697 | 11/1908 | Frasch | 210/415 X |
| 1,574,557 | 2/1926 | Coe | 210/413 X |
| 1,865,061 | 6/1932 | Grob | 210/413 X |
| 3,036,716 | 5/1962 | Schreiber | 210/415 X |
| 3,647,071 | 3/1972 | Lamort | 210/107 |
| 4,081,381 | 3/1978 | Rosenmund et al. | 210/414 X |
| 4,297,210 | 10/1981 | Delfosse | 210/107 |
| 4,376,705 | 3/1983 | Komura et al. | 210/413 |
| 4,399,042 | 8/1983 | Stannard et al. | 210/413 X |

FOREIGN PATENT DOCUMENTS

| 3136773 | 4/1982 | Fed. Rep. of Germany. | |
|---|---|---|---|
| 52847 | 11/1982 | Japan | 210/415 |
| 441230 | 1/1968 | Switzerland. | |
| 689703 | 10/1979 | U.S.S.R. | 210/413 |

Primary Examiner—Robert Spitzer
Attorney, Agent, or Firm—Wegner & Bretschneider

[57] ABSTRACT

There is disclosed a nutsch filter having blades fitted to a central, vertically positioned hollow shaft by a hollow arm, the blades having a plough-like cutting edge and a spatula-like bottom surface acting in the opposite movement direction. A discharge pipe, arranged concentrically to the hollow shaft, is axially displaceable. The discharge pipe is moved upwards against a cover for sealing the filter casing. The filtration or resuspension or drying of the filter cake takes place in this position. In order to discharge the compressed filter cake, the upper edge of the discharge pipe is set by the blades to the level of the paring or skimming process. Paring of the filter cake and conveying of the pared mass into the central discharge pipe opening takes place in a single operation by means of the blades. On drying, hot air or a hot fluid is passed through the cavities of the arm as well as the parts connected thereto.

18 Claims, 5 Drawing Figures

PRESSURE FILTER

BACKGROUND OF THE INVENTION

The invention relates to an improved pressure filter having a casing with a filter arranged therein having a filter material carrier and a conveyor. The conveyor is located on an arm that is axially displaceable and rotatable about a vertical axis. Filter cake that is collected on the filter is conveyed into a centrally, downwardly directed discharge pipe.

Pressure filters of this type are known as nutsch filters and are used for separating suspensions that can be moderately or easily filtered. Such a nutsch filter is described, for example, in Swiss Pat. No. 441,230. In the patent there is shown a nutsch filter having a casing with at least one filter material carrier arranged therein. With the aid of a separate conveyor, the filter cake collected on the filter is conveyed into a discharge pipe arranged concentrically to the vertical casing axis. The discharge pipe is connected to the conveyor in such a way that the pipe necessarily participates in all the vertical movements of the conveyor. The discharge pipe separated from the conveyor only for cleaning and inspection purposes. When such filters are used as nutsch filters, the lower end of the discharge pipe is tightly sealed during the suction filtration process, so that no filter mass can run out. On initially charging filter mass into the pressure filter, as a result of accidental overfilling of the device, filter mass can pass into the upper free opening of the discharge pipe and cause stoppages. In addition, the relatively large volume of the discharge pipe has a disadvantageous effect during suction filtration, because the air contained therein is compressed and leads to difficultly controllable pressure conditions. This compression is disadvantageous because the air volume of the discharge pipe is of the same order of magnitude as that of the remaining filter chamber.

In another known filter means described in West German Offenlegungsschift No. 31 36 773, the lower end of the discharge pipe is closed by a valve, but this point on the pipe is exposed to a high degree of contamination and, due to the filter cake residues deposited there, often leads to stoppages. In this known filter means, paring or skimming knives are provided on a rotary arm and pare or skim the solidified filter cake outwards or in arrow-like manner to either side, so that, as a function of the alignment of the rotating knives, the material is either thrown outwards or to either side of the knives. The piled-up filter mass must then be conveyed to the central removal opening on the filter in a separate operation, while reversing the rotation direction of the arm and using transfer blades, which are also fixed to the arm, but are functionally separated from the knives.

Apart from such nutsch filters providing for central discharge of the filter cake, nutsch filters are known providing for a lateral discharge of the filter cake, particularly using screw conveyors. Although known nutsch filters of this type have proved basically satisfactory in operation, they need improvement on the basis of modern constructional ideas, particularly for facilitating the operation and maintenance of the system. The screw conveyors have proved particularly complicated and prone to faults.

SUMMARY OF THE INVENTION

The present invention is directed to an improvement in known nutsch filters having a central discharge in such a way that the uniformity of the working result, the operational reliability, and the ease of maintenance of the system are increased, while ensuring an at least equivalent reliability. The present invention is directed to a nutsch filter with a casing, a filter arranged therein having both a filter material and a conveyor, the conveyor being located on an arm that is axially displaceable and rotatable about a vertical axis and conveying filter cake collected on the filter into a centrally, downwardly directed pipe where the pipe is axially displaceable with respect to the arm during operation and the upper end of the discharge pipe is closed with a closing means.

As a result of having the downwardly directed pipe axially displaceable with respect to the arm during operation and having the upper end of the discharge pipe closed with a closing means, a simple and reliable central discharge is achieved, which is particularly appropriate for many applications. Through the upwardly movable discharge pipe and the possibility of closing it on the inflow side, the risk of an overflow occurring during filling is reliably prevented. Due to the reduced air volume, it is easier to control the pressure conditions in nutsch filters. By combining the hitherto separate paring and conveying means for the filter cake, a surprisingly advantageous combination is obtained, which not only increases the efficiency of the system, but also greatly simplifies its operation and maintenance. A further vital advantage of the present invention is the ability to compress the filter mass with the aid of blades prior to the actual filtration process, after filtration, to detach the compressed filter cake in a simple and substantially complete manner from the filter bottom. The compression process can be adjusted by setting the axial pressure on the blade arm, enabling the degree of compression to be very sensitively adjusted before the start of filtration. With the aid of blades, the filter cake, if necessary, can be resuspended in a solvent or rinsing agent and this can be followed by a further filtration process. The maintenance of the nutsch filter of the present invention can be carried out by standard washing processes as it is much easier and faster to clean the blades than to clean the screw or belt conveyors. The present device also causes a considerable reduction in the susceptibility to faults caused by jammed filter material, as occurs on the bearings of screw or belt conveyors.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
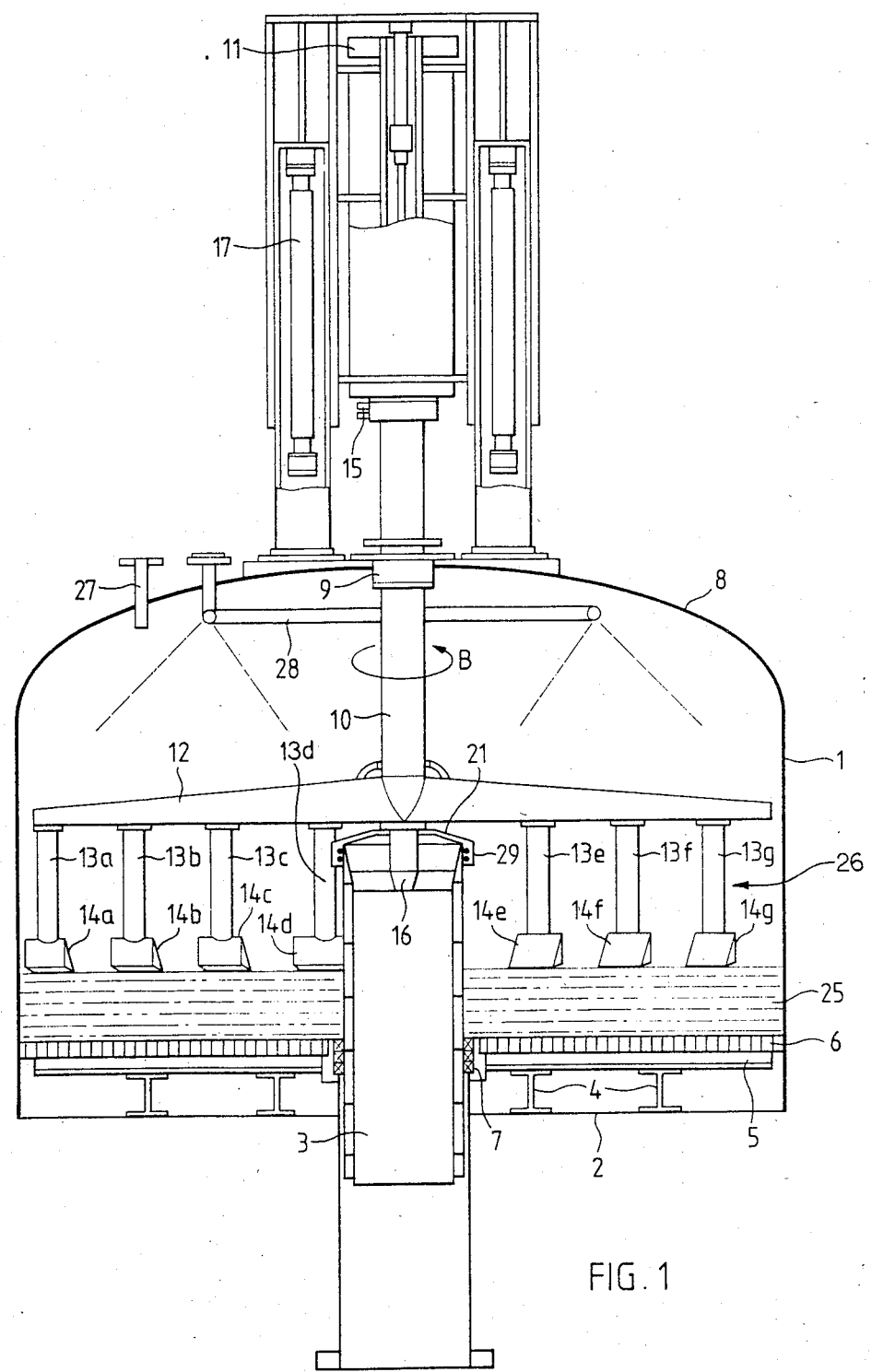
FIG. 1 is a diagrammatic sectional representation of a filter press according to the invention with the material to be filtered introduced thereinto.
Figure 2:
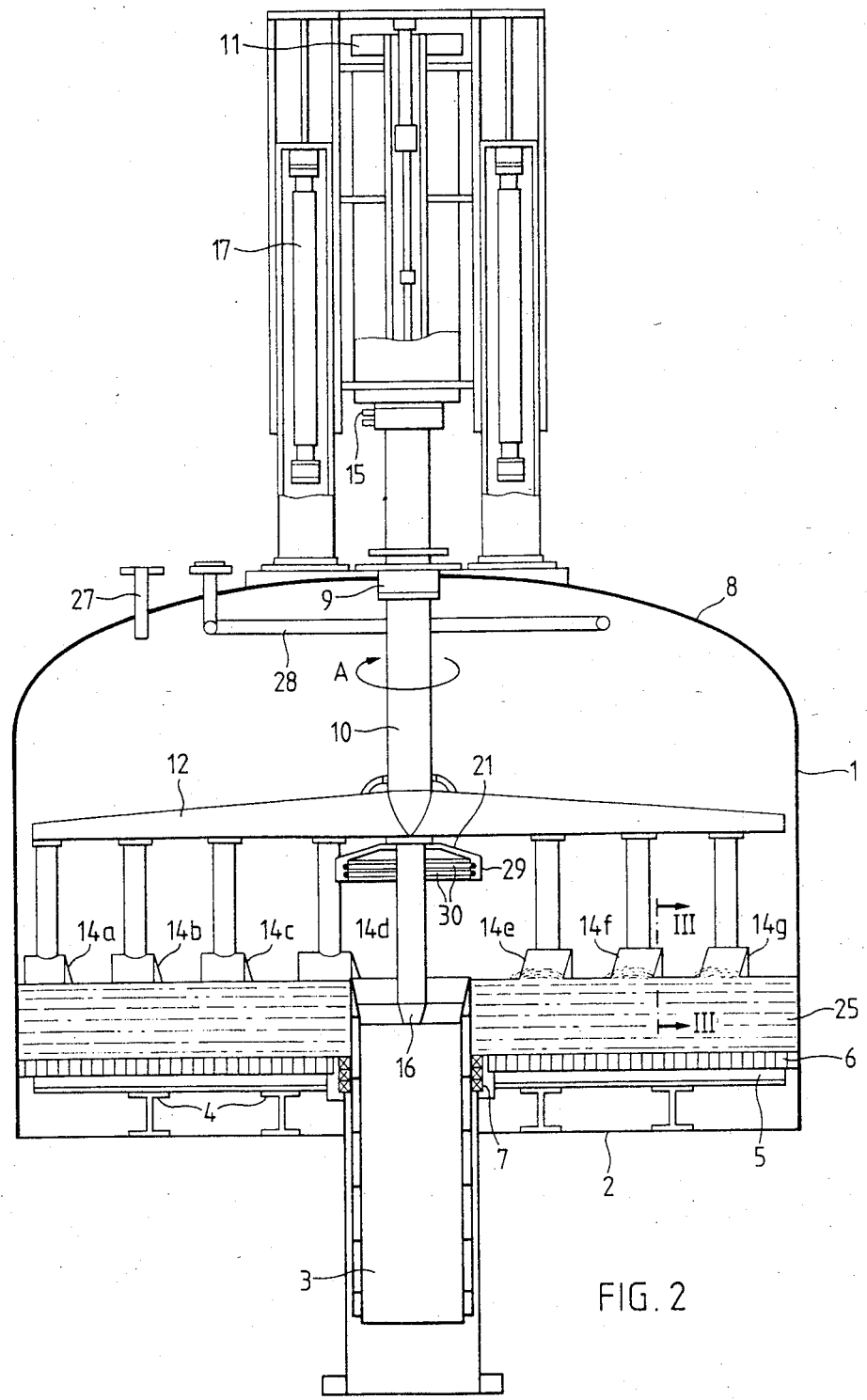
FIG. 2 is a diagrammatical sectional representation of the press according to FIG. 1 in the discharge position.

The filter press depicted in FIGS. 1 and 2 has a cylindrical casing 1 with a circular casing bottom 2. Casing bottom 2 is centrally provided with an opening, through which a vertically displaceable discharge pipe 3 passes from below into the interior of the casing.

A carrier grating 4 with a filter material carrier 5 is supported on casing bottom 2. Finally, a filter 6 is placed on carrier 5. Between the support grating 4 or filter material carrier 5 on the one hand and the discharge pipe 3 on the other are provided packings 7, which can, for example, be constructed as packing glands. Below the filter material carrier 5 is provided the drain for the liquid which has collected there (not shown).

The upper termination of casing 1 is formed by a cover 8 with a centrally arranged, sealed bearing 9. A hollow shaft 10 is passed in axially displaceable and rotary manner through bearing 9. Hollow shaft 10 is connected to corresponding drive means 11, e.g. electric motors or hydraulic adjusting elements.

At its lower end, hollow shaft 10 passes into a pipe arm 12, which is positioned radially with respect to casing 1 of casing bottom 2. On pipe arm 12 are provided vertically directed, tubular blade holders 13a-g, which pass at their lower end into blades 14a-g. The upper part of hollow shaft 10 is provided with fluid connections 15 through which a heating medium, e.g. hot air, hot water, or some other suitable fluid is passed to pipe arm 12, blade holders 13a-g and blades 14a-g. The heating medium flows in a closed circuit manner within this system. At connections 15, hot air is supplied and cooled fluid which has passed through the aforementioned circuit is removed.

A connecting rod 16 passes approximately coaxially within the hollow shaft 10 and is connected at its upper end to second drive means 17 for producing a lifting motion and whose lower end is connected to the discharge pipe 3. Driven by the second drive means 17, the upper end of the discharge pipe can be brought, with the aid of connecting rod 16, into the desired vertical position, as will be described in greater detail hereinafter. The discharge pipe 3 does not perform rotary or lifting movements of the pipe arm 12 connected to hollow shaft 10, or of blades 14a-g. By use of control means (not shown) between the first and second drive means 11 and 17, it is ensured that the lifting movement of hollow shaft 10 and the parts connected thereto and the discharge pipe 3 are matched with one another, e.g. take place synchronously.

Details of the blades 14a-g are explained hereinafter relative to FIG. 3. On a box 18 projecting downwards in movement direction A is provided a base 19, which is lowered in movement direction A with respect to the horizontal by an acute angle of a few degrees, e.g. 5° to 10°. This leads, on the one hand, to formation of a cutting edge 20 acting in movement direction A and, on the other hand, a spreading or pressure surface formed by base 19, which moves the blades in the opposite direction B.

Figure 4:
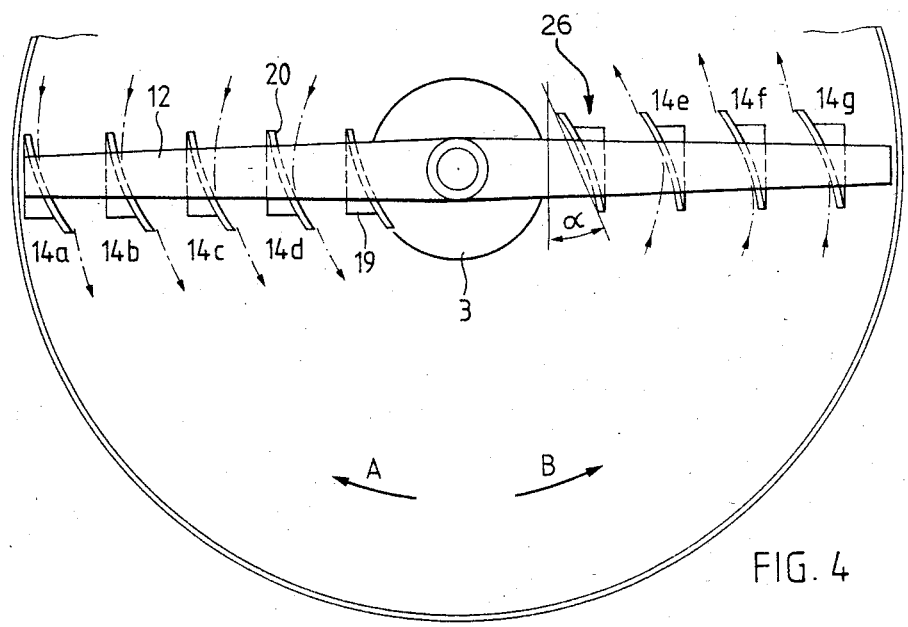
FIG. 4 is a plan view of the blades.

FIG. 4 is a plan view of blades 14a-g shown in FIGS. 1 and 2. Blades 14a to 14d on one arm-half are arranged with a certain radial spacing, while the blades 14e to 14g on the diametrically opposite arm-half have a corresponding radial spacing from one another, but are arranged in the gaps of the first arm-half. On rotating pipe arm 12, there is consequently a complete covering of the bottom surface by the cutting edges 20 of blades 14a to 14g.

As can be further gathered from FIG. 4, cutting edges 20 of blades 14a-g are slightly curved in the plane of the filter bottom or filter cake, in order to ensure a completely satisfactory transfer of the discharged material to the center of the casing when arm 12 is moved in direction A. The removed material is in each case passed from one blade to the next-following inner blade until being passed by the innermost blade into the opening of discharge pipe 3.

Figure 3:
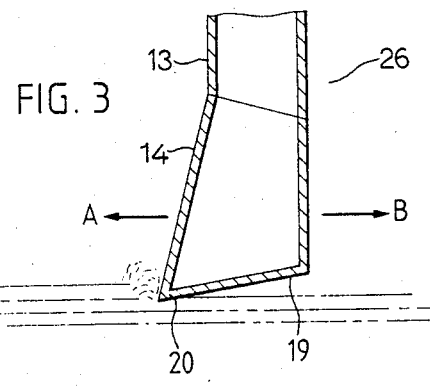
FIG. 3 is a section through line III—III in FIG. 2.

As shown in FIG. 3, blades 14 are constructed in a slightly upwardly tapering manner starting from cutting edge 20. This leads to the formation of a conveyor member 26, which deflects the pared or skimmed material in the desired direction. This function is aided by the construction and alignment of cutting edges 20 or the conveyor members as shown in FIG. 4. Thus, cutting edges 20 and with them the conveyor members 26 have a curved radius (see FIG. 3) that approximately corresponds to the radius of arm 12. With respect to arm 12, cutting edges 20 slope at an angle of $\alpha$ e.g. 60° to 70°. This measure ensures the desired function of paring or skimming while simultaneously conveying the pared or skimmed material towards the center of the filter.

Surprisingly the aforementioned construction of the blades is adequate for the completely satisfactory paring and conveying of the filter cake material towards the center of the filter device into the opening of discharge pipe 3. Thus, neither separate paring and conveying means are provided, nor are separate operations necessary for the same. Instead the filter cake is pared and conveyed by the same means, and in the same operation.

The material to be treated is introduced through a filling opening 27 in cover 8. As shown in FIG. 1, discharge pipe 3 is drawn completely upwards, in which position the upper opening of pipe 3 is closed by a cover 21 fitted to arm 12 and by packings 30, so that even in the case of accidental overfilling of the system, no material can flow into the discharge pipe. Thus, the cover 21 acts as a closing device, which tightly seals the inner area of the filter from the outside. The cover can be replaced by a slide member or some other closing device that is not sensitive to contamination. With the aid of the aforementioned connecting rod 16, the discharge pipe 3 can be displaced axially relative to arm 12, in order, in this simple manner, to close the discharge pipe opening or to open it again for the subsequent discharge of the filter cake.

The filled material is then compressed by base surfaces 19 of blades 14 by rotating arm 12 in the direction of arrow B, hollow shaft 10 being continuously lowered by the first drive means 11. However, lowering can also take place in a step-wise manner. Finally, the degree of compression of a filter material can be very accurately adjusted with the aid of the measure described hereinafter.

Figure 5:
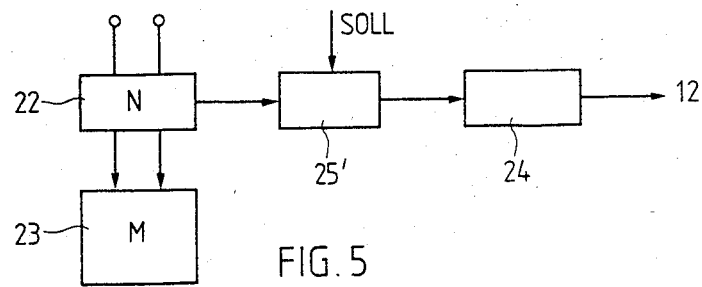
FIG. 5 is a block circuit diagram of a control circuit.

For this purpose, in a particularly advantageous manner and by using a control circuit shown in block diagram form in FIG. 5, a control element 24 is influenced by means of a power measuring device 22 on drive motor 23 for hollow shaft 10, so that the element affects the vertical adjustment of arm 12 in a load-controlled manner. The value determined by the power measuring device is compared with an adjustable desired value in a comparator 25', located between power measuring device 22 and control element 24. Control element 24 is influenced for the vertical movement of arm 12 as a function of the comparison result.

The subsequent filtration process takes place in a per se known manner by producing overpressure in the upper part of casing 1 or by producing an underpressure below the filter material carrier 5. In addition, both these methods can be combined. During this stage, the discharge pipe remains in the upper, closed position as shown in FIG. 1, cover 21 sealing the inner area of the filter at the discharge pipe inlet, so that the relatively large air volume within the discharge pipe 3 no longer has a disadvantageous effect during the pressure build-up.

At the end of the filtration process, the compressed filter cake on filter 6 is discharged in the manner described hereinafter. As shown in FIG. 2, initially the discharge pipe 3 is removed from arm 12 with the aid of connecting rod 16, as well as the cover 21 connected thereto, and lowered to the upper level of the filter cake 25, so that the removed material can be conveyed into the upper opening of the discharge pipe. Arm 12 is then rotated in direction A. As a result of the controlled lowering of arm 12 on to filter cake 25, the blades 14 peel off the filter cake layer by layer and convey the removed material to the center and into the opening of discharge pipe 3. During this process, discharge pipe 3 is continuously lowered together with arm 12.

Alternatively and prior to this process, the filter cake can be suspended with the discharge pipe closed and accompanied by the addition of washing liquid from a spray tube 28. Arm 12 thereby performs the same movements as for the removal process.

With the discharge pipe 3 closed, the suspended mass can also undergo a drying process, for which purpose the arm is moved in the manner described hereinbefore in direction A. In addition, using the fluid connections 15 a heating medium is supplied, which circulates in arm 12 and in the parts connected thereto. This leads to a particularly effective heating of the inner area or the material to be filtered and dried, because the surface used for heating purposes is considerably enlarged compared with known filters of this type.

What is claimed is:
1. A nutsch filter which comprises:
    (a) a casing having a cover and a casing bottom with an aperture in the center of the bottom;
    (b) a filter located within the casing;
    (c) a discharge pipe with an opening at the upper end of the pipe, said discharge pipe passing through the aperture in the casing bottom, and said discharge pipe being axially moveable with respect to the casing;
    (d) conveyor means within the casing for conveying the material of a filter cake in the direction of the center of the casing and into the upper opening of the discharge pipe, said conveyor means including an arm and a plurality of conveyor members located on the arm, said arm extending radially in the casing and attaching to a hollow shaft passing through the cover of the casing, said hollow shaft being capable of rotating and moving axially with respect to the casing, and said arm including on the lower side thereof a closing device for tightly sealing the upper opening of the discharge pipe when the discharge pipe strikes the lower side of the conveyor arm; and
    (e) first drive means for rotatably and axially moving the hollow shaft with respect to the casing.

2. the nutsch filter of claim 1, wherein the closing device is a cover attached to the lower side of the conveyor arm, said cover having an edge overlapping the upper end portion of the discharge pipe when the discharge pipe contacts the cover.

3. The nutsch filter of claim 1, further comprising packings that are located between the bottom of the casing and the discharge pipe.

4. The nutsch filter of claim 3, wherein the packings are packing glands.

5. The nutsch filter of claim 1, wherein the conveyor member includes a vertically directed holder, the upper end portion of said holder being connected to the conveyor arm, and said holder having paring means at the lower end thereof for paring the filter cake.

6. The nutsch filter of claim 5, wherein the holder, the paring means, and the arm are hollow, said hollow spaces of the holder, paring means, and arm being interconnected and connected to the hollow shaft, said upper part of the shaft having fluid connections.

7. The nutsch filter of claim 6, wherein the first drive means can rotate the arm in clockwise and counter-clockwise directions and wherein the paring means of the conveyor member has a blade curved within the plane of the filter, said blade having a base that is downwardly directed with respect to the horizontal such that the base forms a cutting edge.

8. The nutsch filter of claim 7, wherein the radius of curvature of the blades has a length substantially similar to the length of the arm radius.

9. The nutsch filter of claim 7, wherein the blade has a paring edge that defines an acute angle with respect to the main axis of the arm.

10. The nutsch filter of claim 5, wherein spaces of uniform length separate the blades on each half of the arm, the blades on the first half of the arm being arranged such that the location of the blades corresponds to the spaces of the second half of the arm.

11. The nutsch filter of claim 1, wherein the discharge pipe is axially adjustable by means of a connecting rod coaxially within the hollow shaft, the lower end of the connecting rod contacting the discharge pipe, and wherein the connecting rod is capable of moving the discharge pipe axially with respect to the arm, said connecting rod being actuated by a second drive means.

12. The nutsch filter of claim 11, wherein the first drive means and the second drive means are connected to each other by a control device to provide for synchronous lifting movements of the hollow shaft and the discharge pipe when the discharge pipe strikes the lower side of the conveyor arm.

13. The nutsch filter of claim 1, wherein a power measuring device is connected to the first drive means and to a comparator, said comparator receiving the desired value of pressure on the filter and wherein the output of the comparator is led to a control element effecting the vertical adjustment of the conveyor arm in a load-controlled manner.

14. The nutsch filter of claim 1, wherein a spray tube is located in the upper part of the casing between the conveyor arm and the cover.

15. A nutsch filter which comprises:
    (a) a casing;
    (b) a filter arranged within said casing, said filter containing a filter material carrier;

(c) conveyor means located on a pipe arm wherein the conveyor means includes a plurality of hollow blades, each of said blades having at least one paring or cutting edge, said paring or cutting edge and the associated blades forming a conveyor member acting in the direction of the center upon rotation of the pipe arm, said pipe arm being axially displaceable and rotatable about a vertical axis and being fixed to a hollow shaft such that the hollow shaft, the pipe arm, and the blades form a common line system for a fluid heating system, and wherein the conveyor members constitute the sole conveying means such that both paring of the filter cake by the paring edge and conveying of the pared material in the direction of the center take place by rotation of the arm in the same rotation direction; and (d) a centrally, downwardly directed discharge pipe into which the filter cake collected on said filter is conveyed by the conveyor means, said discharge pipe having an upper end and a lower end and being axially displaceable with respect to the arm during operation, said upper end being closed with closing means.

16. The nutsch filter of claim 15, wherein said discharge pipe is axially adjustable by means of a connecting rod guided within said hollow shaft.

17. The nutsch filter of claim 15, wherein the blades are connected to said pipe arm by means of tubular blade holders.

18. The nutsch filter of claim 15, further comprising drive means for the rotary movement of said hollow shaft, wherein a power measuring device is connected to said drive means and via a desired value comparator is connected to a control element for the axial adjustment of said hollow shaft and the parts connected thereto.

* * * * *